United States Patent
Sato

(10) Patent No.: US 9,889,561 B2
(45) Date of Patent: Feb. 13, 2018

(54) ROBOT CONTROLLER HAVING FUNCTION FOR DISPLAYING ROBOT AND FORCE

(71) Applicant: FANUC CORPORATION, Yamanashi (JP)

(72) Inventor: Takashi Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/175,039

(22) Filed: Jun. 7, 2016

(65) Prior Publication Data

US 2016/0354933 A1 Dec. 8, 2016

(30) Foreign Application Priority Data

Jun. 8, 2015 (JP) .................................. 2015-115899

(51) Int. Cl.
*B25J 9/16* (2006.01)
*B24B 27/00* (2006.01)
*B25J 11/00* (2006.01)

(52) U.S. Cl.
CPC ......... *B25J 9/1633* (2013.01); *B24B 27/0038* (2013.01); *B25J 9/1671* (2013.01); *B25J 11/0065* (2013.01); *G05B 2219/35327* (2013.01); *G05B 2219/37076* (2013.01); *G05B 2219/37086* (2013.01); *G05B 2219/37091* (2013.01)

(58) Field of Classification Search
CPC .... B25J 9/1633; B25J 9/1671; B25J 11/0065; B24B 27/0038; G05B 2219/35327; G05B 2219/37076; G05B 2219/37086; G05B 2219/37901; G06F 17/5009
See application file for complete search history.

(56) References Cited

U.S. PATENT DOCUMENTS

| | | |
|---|---|---|
| 2005/0222714 A1 | 10/2005 | Nihei et al. |
| 2008/0255772 A1 | 10/2008 | Sjostrand et al. |
| 2012/0004774 A1 | 1/2012 | Umetsu |

FOREIGN PATENT DOCUMENTS

| | | |
|---|---|---|
| CN | 1676287 A | 10/2005 |
| CN | 101241359 A | 8/2008 |
| CN | 102310409 A | 1/2012 |
| CN | 104057290 A | 9/2014 |
| EP | 0671246 A2 | 9/1995 |
| JP | 6-110543 A | 4/1994 |
| JP | 11-224116 A | 8/1999 |
| JP | 2006-977 A | 1/2006 |
| JP | 2009-269155 A | 11/2009 |

*Primary Examiner* — Abby Y Lin
(74) *Attorney, Agent, or Firm* — Hauptman Ham, LLP

(57) ABSTRACT

A robot controller, by which an operator can visually or intuitively understand the direction and/or magnitude of an actual force applied to an arbitrary portion of a workpiece. The controller controls a motion of a robot so that one of a work tool and a workpiece is moved relative to the other, and carries out a predetermined operation. The controller has a force detecting part which detects a force acting between the work tool and the workpiece; and a displaying part which displays a simulated image or video of the robot. The displaying part displays a trajectory of working points on the workpiece, and the force detecting part detects the force applied to each working point when the work tool passes through the working point. The displaying part displays the detected force as a line segment, etc., extending from the working point or a point near the working point.

5 Claims, 9 Drawing Sheets

ROBOT CONTROLLER HAVING FUNCTION FOR DISPLAYING ROBOT AND FORCE

RELATED APPLICATIONS

The present application claims priority to Japanese Patent Application Number 2015-115899 filed Jun. 8, 2015, the disclosure of which is hereby incorporated by reference herein in its entirety.

BACKGROUND OF THE INVENTION

1. Field of the Invention

The present invention relates to a robot controller having a function for displaying a robot and a force applied to a workpiece to be processed by the robot.

2. Description of the Related Art

In many cases, a force sensor is used when an operation such as polishing, burring or close tolerance fitting of a plurality of workpieces, etc., is carried out by using a robot. Concretely, by using a force detector such as a force sensor or a load cell, a force and/or moment generated during the operation is detected, and the motion of the robot is controlled so that the detected force and/or moment is equal to a desired value.

For example, in the polishing, an abrasive tool (such as a grinder, a sander or a buff) is moved while being pressed to a surface of a workpiece to be polished at a constant force, whereby a preferable polishing quality can be obtained. Otherwise, the robot may grip the workpiece and move the gripped workpiece while pressing the workpiece against a fixed grinder, sander or buff at a constant force.

In the above operation using the robot, force control of the robot is carried out so that the force detected by the force sensor is constant. In this regard, the detected force may be displayed on a graph so as to monitor the actual force. As a relevant prior art document, JP 2009-269155 A discloses a teaching device including: a force information input means for inputting three-dimensional force information applied to a work gripping part detected by a force detecting part arranged on a robot; an image information input means for obtaining image data from a camera for capturing a working area of the robot; an operation command input means for inputting an operation command input signal for teaching the robot; and an image display means for simultaneously displaying an image of the workpiece actually captured when teaching and an image of the tree-dimensional force information applied to the work grip part, based on the three-dimensional force information, the image data and the operation command input signal.

Further, JP 2006-000977 A discloses a display device in which an amount of protrusion of a front end of a hand of a slave robot into an environment is calculated, a contact force and moment are predicted based on the amount of protrusion, and the predicted force and moment are displayed as arrows so as to be overlapped with an actual image captured by a camera.

A method of displaying a graph representing a force is useful to know a magnitude of the force with an elapsed time or a magnitude of the force with respect to positions of axes of an orthogonal coordinate system. However, in such a method, it is difficult to intuitively understand the direction or magnitude of the force actually applied to an arbitrary portion of the workpiece. For example, in the technique of JP 2009-269155 A, force information can be displayed on the image of the working area of the robot, whereby it is clarified as to whether or not the workpieces come into contact with each other during the teaching operation, and/or whether or not an excess force is applied to the workpiece. However, the technique of JP 2009-269155 A is not suitable understand as to how the force functions in the series of working process, or where in the workpiece the applied force is maximum or minimum.

On the other hand, the technique of JP 2006-000977 A relates to a remotely operated robot in which a communication delay may be generated. Therefore, similarly to the technique of 2009-269155 A, the technique of JP 2006-000977 A is not suitable understand as to how the force functions in the series of working process, or where in the workpiece the applied force is maximum or minimum.

SUMMARY OF THE INVENTION

An object of the present invention is to provide a robot controller, by which an operator can visually or intuitively understand the direction and/or magnitude of an actual force applied to an arbitrary portion of a workpiece.

The present invention provides a robot controller which controls a motion of a robot so that one of a work tool and a workpiece to be processed by the work tool is moved relative to the other, and carries out a predetermined operation, the robot controller comprising: a force detecting part which detects a force acting between the work tool and the workpiece; and a displaying part which displays a simulated image or video of the robot, wherein the displaying part displays a trajectory of working points on a surface of the workpiece, the force by the work tool being applied to the working point, wherein the force detecting part detects the force applied to each working point when the work tool passes through the working point on the trajectory, and wherein the displaying part displays the detected force as a line segment or a line segment-like shape, an origin of which corresponding to the working point or a point in the vicinity of the working point.

In a preferred embodiment, the displaying part displays a coordinate system for representing a position of the robot, and displays the force detected by the force detecting part as a vector on the coordinate system.

In a preferred embodiment, the displaying part displays an orthogonal coordinate system, constituted by X-, Y- and Z-axes, for representing a position of the robot, and displays a line segment or vector in a predetermined direction, with respect to only one or more factor selected from among X-, Y- and Z-components of the force or a magnitude of the force, detected by the force detecting part.

In a preferred embodiment, the displaying part displays the line segment or the line segment-like shape while changing a color thereof, based on a magnitude of the force.

In a preferred embodiment, when a magnitude of the force satisfies a predetermined condition, the displaying part displays the line segment or the line segment-like shape representing the force, while blinking the line segment or the line segment-like shape, or while indicating a mark in the vicinity of the line segment or the line segment-like shape.

BRIEF DESCRIPTION OF THE DRAWINGS

The above and other objects, features and advantages of the present invention will be made more apparent by the following description of the preferred embodiments thereof with reference to the accompanying drawings wherein:

FIG. 3b is a view similar to FIG. 3a, in which the posture of the abrasive tool relative to the workpiece is different from FIG. 3a;

FIG. 7b is a view similar to FIG. 7a, in which the posture of the workpiece relative to the abrasive tool is different from FIG. 7a;

DETAILED DESCRIPTION

Hereinafter, as a preferred embodiment of the present invention, a robot system for carrying out an operation such as polishing, etc., by using a robot will be explained. Note that the present invention can also be applied to a robot for carrying out another operation such as burring, precise fitting or screwing, etc., with respect to an intended workpiece, in which a force is generated during the operation. Hereinafter, the term "force" means a force in a translational direction, whereas the term "force" may include a force moment (or a force in a rotational direction) as needed.

First Embodiment

Figure 1:
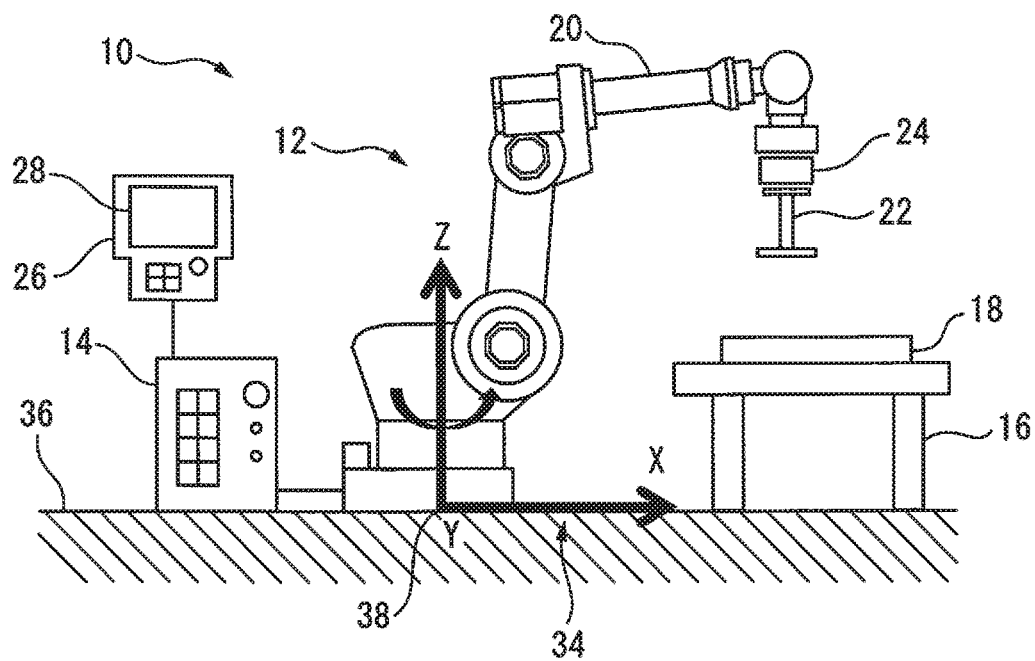
FIG. 1 shows a schematic configuration of a robot system according to a first embodiment of the present invention.

A robot system 10 as shown in FIG. 1 includes a robot (mechanical unit) 12 and a robot controller 14 for controlling robot 12. Robot 12 is configured to polish a surface of workpiece 18 having a generally planar shape, fixed to a working table 16. For example, robot 12 is a multi-joint robot having six axes, and has a robot arm 20, a work tool 22 such as an abrasive tool (e.g. a grinder, a sander or a buff) attached to robot arm 20, and a force detecting part (or a force sensor) 24 for detecting a force acting between work tool 22 and workpiece 18. In the illustrated embodiment, force sensor 24 is attached between a front end (or a wrist element) of robot arm 20 and abrasive tool 22, so as to detect the force applied to a working point of workpiece 18 (as explained below) by abrasive tool 22 (at the moment) when the abrasive tool passes through the working point.

As force sensor 24, for example, a strain gauge, a device for measuring a change in capacitance between electrodes, a magnetic sensor or a photosensor may be used, while the present invention is not limited as such. In general, although there are various types of force sensors (e.g., a six-axis sensor configured to detect the force in each direction of three axes (X, Y and Z) orthogonal to each other and the force moment about respective three axes, or a three-axis sensor configured to detect only the force in each direction of the three axes), any type of force sensor may be used in the present invention.

Measurement information obtained by force sensor 24 is transmitted to robot controller 14, and then robot controller 14 carries out force control so that the force acting between abrasive tool 22 and workpiece 18 is equal to a predetermined pressing force. As the force control, conventional impedance control, damping control or hybrid control, etc., may be used.

Figure 2:
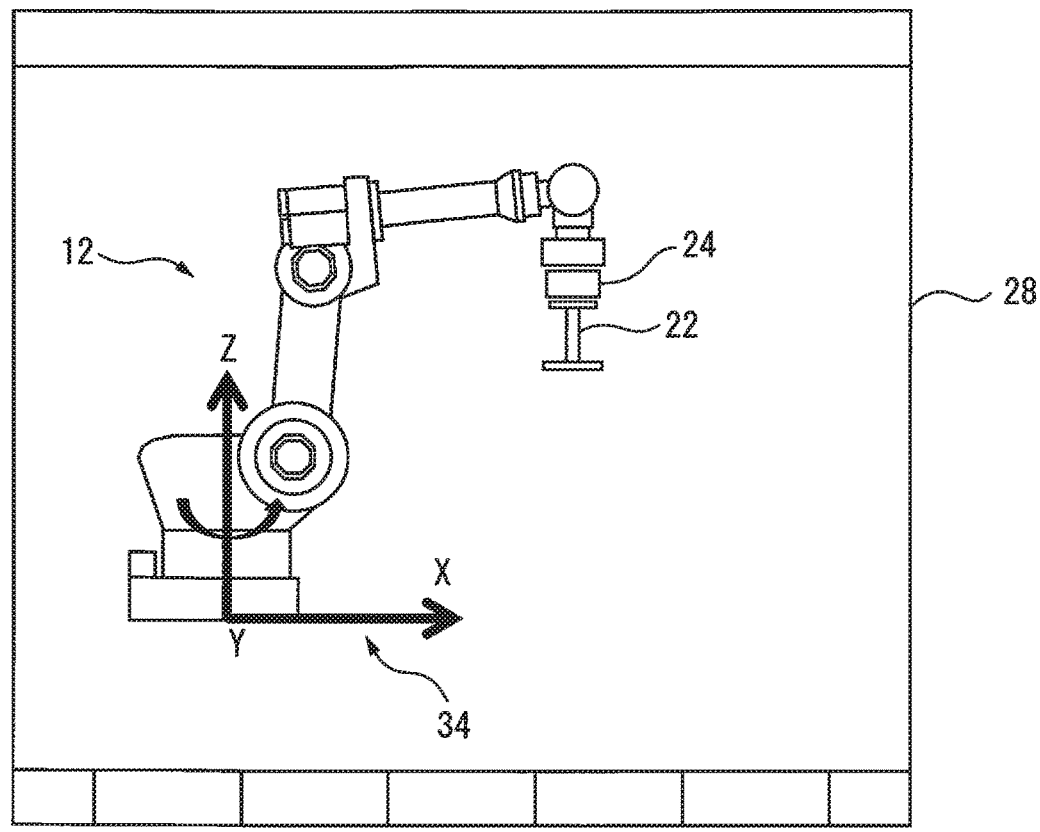
FIG. 2 shows an example in which a robot included in the robot system of FIG. 1 is displayed on a displaying part.

As shown in FIG. 1, robot controller 14 is connected to a teaching pendant 26 for teaching robot 12 and monitoring or setting each status of robot 12. As shown in FIG. 2, a simulated image or video of robot system 10, including robot 12, working table 16, workpiece 18 and a jig (not shown) for fixing workpiece 18, etc., can be displayed on a displaying part (or an indicator) 28 of teaching pendant 26. When the video is displayed, a displayed robot on indicator 28 may move corresponding to the motion of an actual robot. On indicator 28, only the image or the video may be displayed, otherwise, various information (such as a motion program or a signal of robot 12) may be displayed in addition to the image or the video. Further, on indicator 28, the image or the video may be zoomable, and robot system 10 may be translated and/or rotated. Although indicator 28 is illustrated as a portion of teaching pendant 26, the indicator may be arranged on robot controller 14. Otherwise, a display of a personal computer, a tablet PC or a mobile terminal, etc., may be used as indicator 28.

Figure 3A:
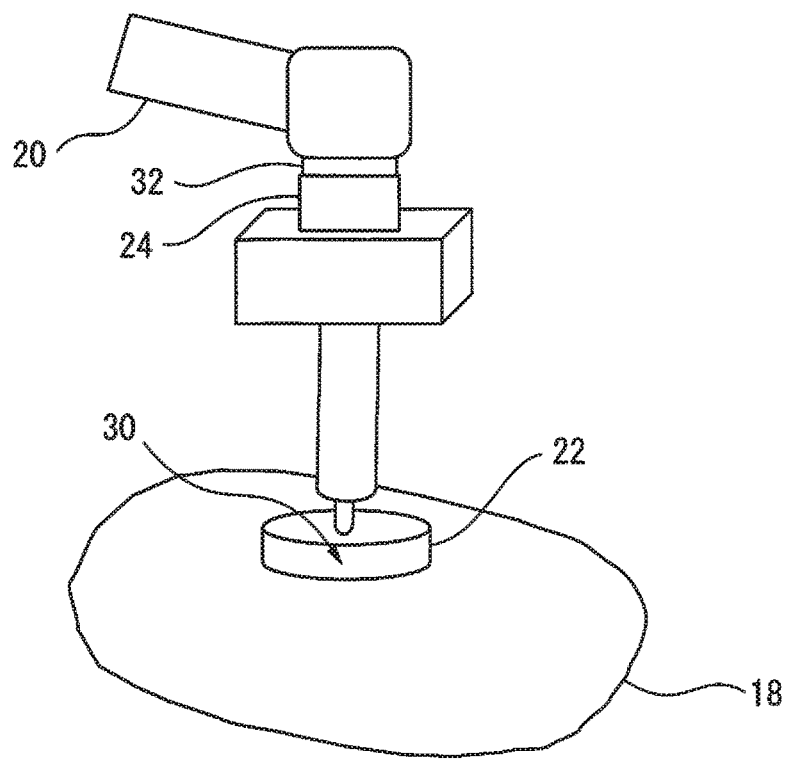
FIG. 3a shows an abrasive tool attached to the robot and a workpiece to be polished by the abrasive tool, in the first embodiment.
Figure 3B:
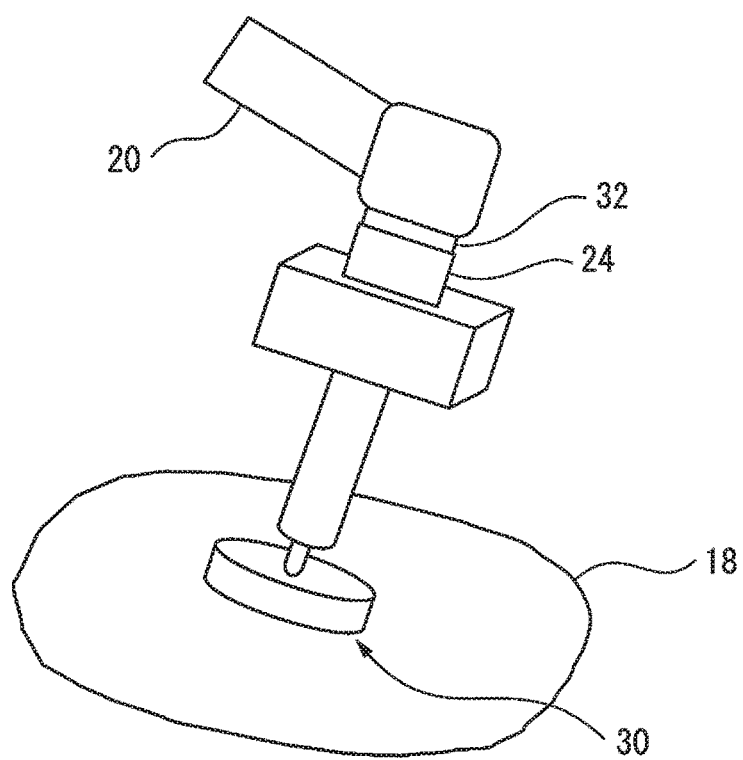

As shown in FIGS. 3a and 3b, a specified point of abrasive tool 22 or a contact point between abrasive tool 22 and workpiece 18 is defined as a control point (or a working point) 30. In general, it is difficult to precisely determine the actual contact point. However, in this embodiment, a center point of a surface where abrasive tool 22 contacts workpiece 18 may be defined as control point 30, as shown in FIG. 3a. Otherwise, a point where abrasive tool 22 is assumed to contact workpiece 18 may be defined as control point 30, as shown in FIG. 3b.

In detail, FIG. 3a shows an example in which abrasive tool 22 is pressed to workpiece 18 while the posture of abrasive tool 22 is always vertical (90 degrees) relative to the surface of workpiece 18. When both the surfaces of abrasive tool 22 and workpiece 18 are planar, the surfaces of them contact to each other (i.e., surface-contact is carried out), and thus the center point of the surface of abrasive tool 22 is determined as working point 30. The position of working point 30 may be geometrically calculated, from a center point of a mechanical flange 32 of robot 12, based on the shape and dimension of abrasive tool 22, alternatively, may be determined by using a conventional method such as a three-point teaching method or a six-point teaching method for calculating a tool center point (TCP).

FIG. 3b shows an example in which the posture of abrasive tool 22 is not vertical (90 degrees) relative to workpiece 18, i.e., abrasive tool 22 is pressed to workpiece 18 while being inclined by certain degrees. In this case, a point of abrasive tool 22 nearest to workpiece 18 may be determined as working point (or contact point) 30. Similarly to FIG. 3a, the position of the working point may be geometrically calculated, from the center point of mechanical flange 32 of robot 12, based on the shape and dimension of abrasive tool 22, alternatively, may be determined by using a conventional method such as a three-point teaching method or a six-point teaching method for calculating a tool center point (TCP).

As shown in FIG. 1, an orthogonal coordinate system 34 is defined with respect to robot 12, and the position of the working point as explained above may be represented as a coordinate value (X, Y, Z) on orthogonal coordinate system 34. As exemplified in FIG. 1, a floor surface 36 on which robot 12 is located is defined as an X-Y plane, and an intersection point 38 between the X-Y plane and an axis (in this case, J1 axis) among a plurality axes of robot 12, which is the nearest to floor surface 36 and is not perpendicular to the Z-axis (i.e., the axis is not included in a plane parallel to the X-Y plane), is defined as the origin of coordinate system 34. Further, an axis extending in the front direction of robot 12 is defined as the X-axis, an axis included in the X-Y plane and perpendicular to the X-axis is defined as the Y-axis, and an axis perpendicular to the X-Y plane is defined as the Z-axis. In addition, as shown in FIG. 2, an orthogonal coordinate system corresponding to coordinate system 34 can also be defined and displayed on indicator 28 with respect to the displayed robot.

The position of working point (or control point) 30 as explained above can be converted to the coordinate value (X, Y, Z) on orthogonal coordinate system 34, by executing a conventional kinematics method, etc. During the abrasive operation of robot 12, robot controller 14 obtains the position of working point 30 on coordinate system 34 and the pressing force at the position of the working point at predetermined time intervals. Further, indicator 28 can display the position of control point 30 on coordinate system 34. In this regard, all of the obtained positions of the working points may be displayed, alternatively, the number of working points to be displayed may be decreased depending on a number of pixels or a display rate, etc., of indicator 28. By connecting the displayed positions in chronological order, a trajectory 39 of the working points during the abrasion can be obtained (see FIG. 4).

Figure 4:
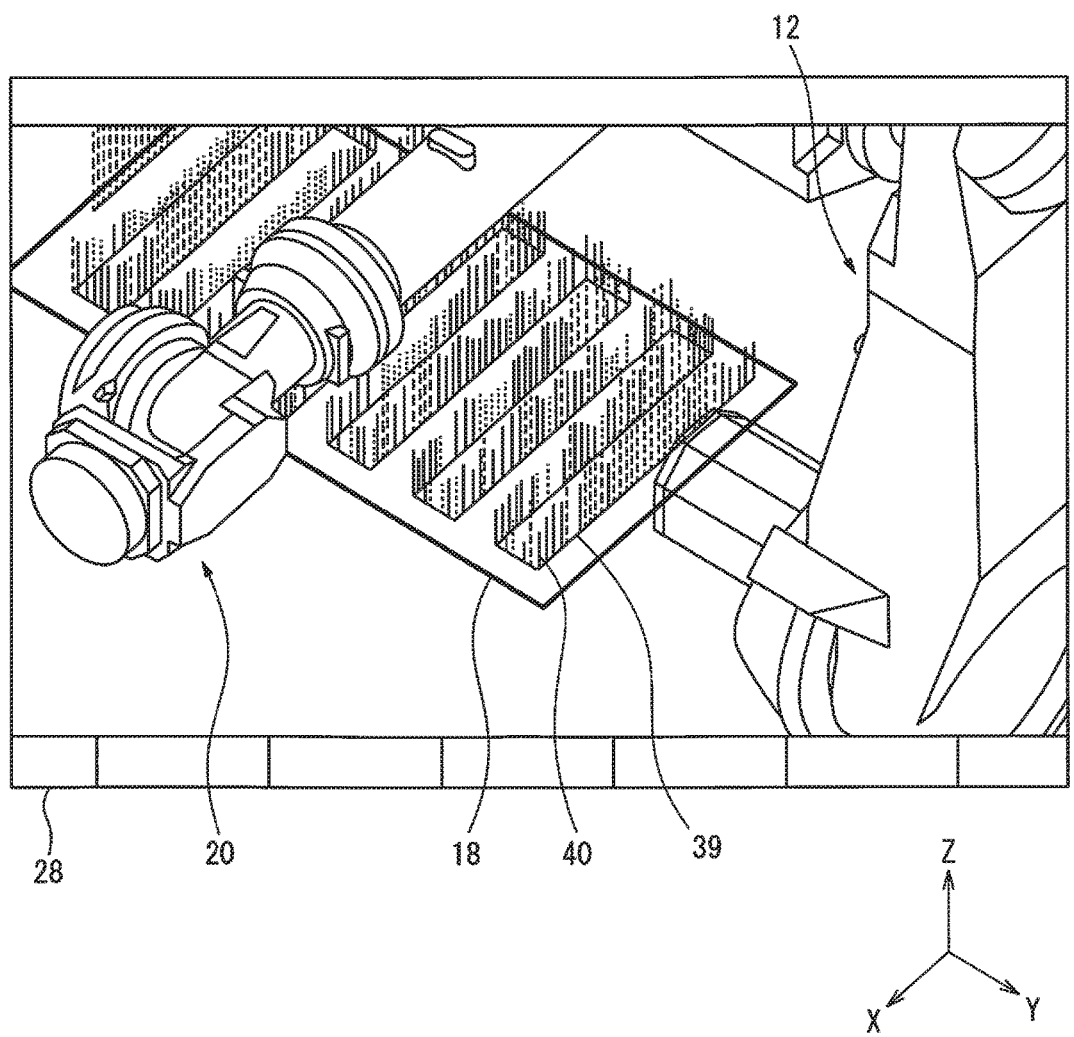
FIG. 4 shows an example in which a force at each working point on the workpiece is displayed as a line segment.

As shown in FIG. 4, robot controller 14 calculates the magnitude of the acting force (or the pressing force) at each position of a plurality of working points 30 for constituting trajectory 39 of abrasive tool 22 on workpiece 18. Then, indicator 28 displays the pressing force as a line segment 40 extending in the Z-direction, the origin of which corresponds to each working point or a point in the vicinity of the working point. In this regard, the expression "in the vicinity of (the working point)" herein means that the line segment does not extend precisely from the corresponding working point, but the operator can understand at which working point the line segment represents the force.

It is preferable that the length of line segment 40 be proportional to the magnitude of the pressing force. For example, the force of one newton (1N) may be represented as a line segment having the length of 10 mm on orthogonal coordinate system 34. In this regard, the extending direction of line segment 40 or the length corresponding to 1N may be appropriately set or modified.

Instead of line segment 40 extending in the +Z-direction, a force vector may be displayed. For example, when the force vector is (1.5N, 0.23N, 36.2N) and the force of 1N is represented as the length of 10 mm, the force is represented as a vector (15 mm, 2.3 mm, 362 mm) having the origin corresponding to each working point, on orthogonal coordinate system 34.

Further, a line segment or a vector extending in a predetermined direction may be displayed, with respect to only one or more factor selected from among X-, Y- and Z-components of the force or the magnitude of the force, detected by force detecting part 24. For example, only the X-component of the force at each working point may be displayed as a line segment extending in the +Z-direction.

Indicator 28 may have various display styles. For example, a line segment-like shape, such as the above vector, a column or an arrow, may be used instead of line segment 40. In addition, indicator 28 may display the line segment or the line segment-like shape in real-time during the abrasion. Otherwise, during the abrasion, the position and the force of the working point may be associated with each other and may be stored in a suitable memory, and then the stored position and the force may be displayed together after the abrasion.

Indicator 28 may change display colors depending on the magnitude of the force, whereby the operator can easily and visually find a position where the force is excessive or a position where the force is insufficient. For example, when the magnitude of the force at each working point is lower than a predetermined first threshold (for example, corresponding to 80% of a setting value), the color of the line segment or the line segment-like shape may be first color (e.g., white) (in FIG. 4, indicated by a dotted line). Further, when the magnitude of the force at each working point is higher than a predetermined second threshold (for example, corresponding to 120% of the setting value), the color of the line segment or the line segment-like shape may be second color (e.g., red) (in FIG. 4, indicated by a broken line), and when the magnitude of the force at each working point is between the first and second thresholds (i.e., from 80% to 120% of the setting value), the color of the line segment or the line segment-like shape may be third color (e.g., green) (in FIG. 4, indicated by a solid line).

As another displaying method, when the magnitude of the force satisfies a predetermined condition, the line segment or the line segment-like shape representing the force may be blinked, or a mark may be displayed in the vicinity of the line segment or the line segment-like shape. For example, when the magnitude of the force is higher than the second threshold, the line segment or the line segment-like shape representing the force may be blinked. Alternatively or additionally, in the vicinity of the line segments or the line segment-like shapes representing the maximum force and the minimum force, characters such as "maximum" and "minimum" may be added, respectively, or a sign such as a circle may be added.

Second Embodiment

Figure 5:
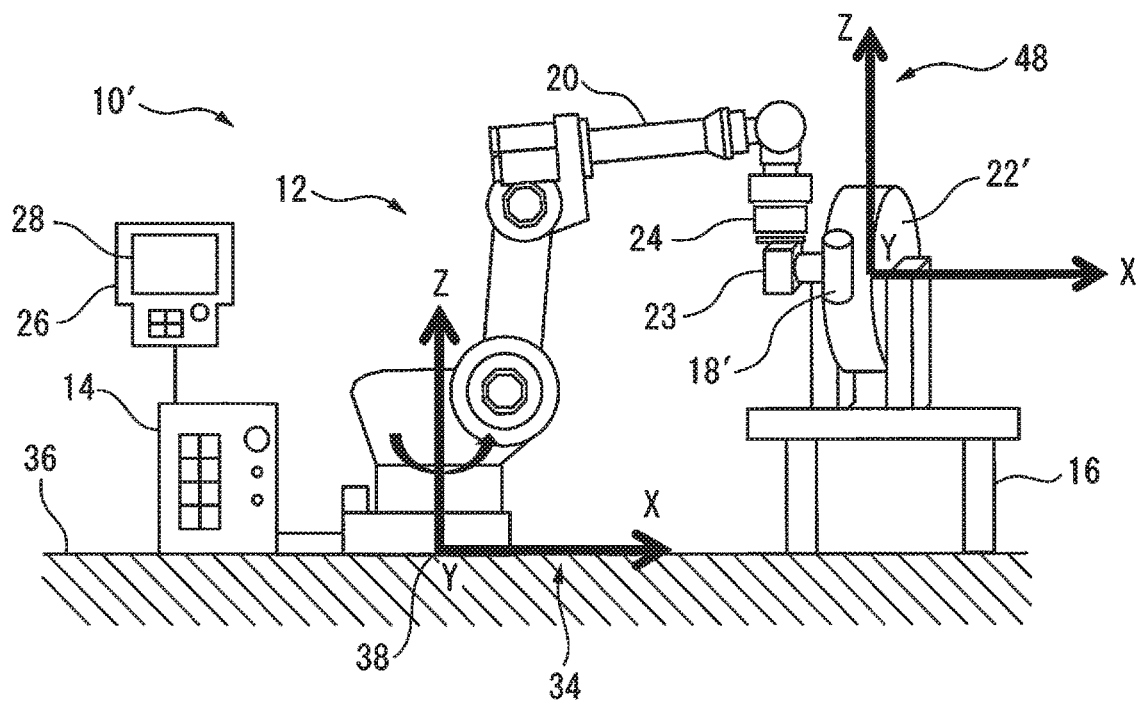
FIG. 5 shows a schematic configuration of a robot system according to a second embodiment of the present invention.

A robot system 10' as shown in FIG. 5 includes a robot (mechanical unit) 12 and a robot controller 14 for controlling robot 12. Robot 12 is configured to grip a workpiece 18', and polish workpiece 18' by pressing workpiece 18' to an abrasive tool 22' (e.g. a grinder, a sander or a buff) fixed to a working table 16. For example, robot 12 is a multi-joint robot having six axes, and has a robot arm 20, a robot hand 23 attached to robot arm 20 and configured to grip workpiece 18', and a force detecting part (or a force sensor) 24 for detecting a force acting between work tool 22' and workpiece 18'. In the illustrated embodiment, force sensor 24 is attached between a front end (or a wrist element) of robot arm 20 and robot hand 23, so as to detect the force applied to a working point of workpiece 18' by abrasive tool 22' (at the moment) when the abrasive tool passes through the working point.

As force sensor 24, for example, a strain gauge, a device for measuring a change in capacitance between electrodes, a magnetic sensor or a photosensor may be used, while the present invention is not limited as such. In general, although there are various types of force sensors (e.g., a six-axis sensor configured to detect the force in each direction of three axes (X, Y and Z) orthogonal to each other and the force moment about respective three axes, or a three-axis sensor configured to detect only the force in each direction of the three axes), any type of force sensor may be used in the present invention.

Measurement information obtained by force sensor 24 is transmitted to robot controller 14, and then robot controller 14 carries out force control so that the force acting between abrasive tool 22' and workpiece 18' is equal to a predetermined pressing force. As the force control, conventional impedance control, damping control or hybrid control, etc., may be used.

Figure 6:
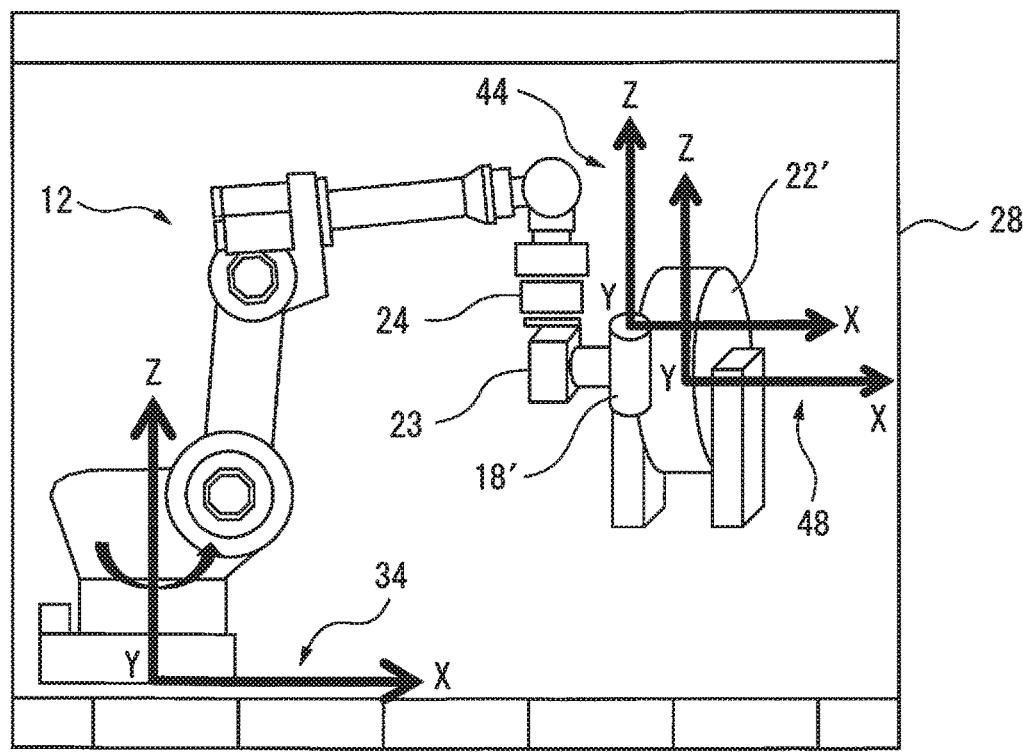
FIG. 6 shows an example in which a robot included in the robot system of FIG. 5 is displayed on a displaying part.

As shown in FIG. 5, robot controller 14 is connected to a teaching pendant 26 for teaching robot 12 and monitoring or setting each status of robot 12. As shown in FIG. 6, a simulated image or video of robot system 10', including robot 12, workpiece 18' working table 16, and abrasive tool 22' fixed to working table 16, etc., can be displayed on a displaying part (or an indicator) 28 of teaching pendant 26. When the video is displayed, a displayed robot on indicator 28 may move corresponding to the motion of an actual robot. On indicator 28, only the image or the video may be displayed, otherwise, various information (such as a motion program or a signal of robot 12) may be displayed in addition to the image or the video. Further, on indicator 28, the image or the video may be zoomable, and robot system 10' may be translated and/or rotated. Although indicator 28 is illustrated as a portion of teaching pendant 26, the indicator may be arranged on robot controller 14. Otherwise, a display of a personal computer, a tablet PC or a mobile terminal, etc., may be used as indicator 28.

Figure 7A:
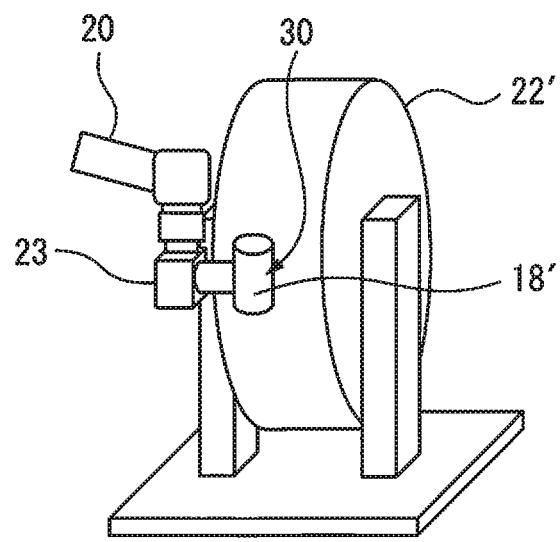
FIG. 7a shows a workpiece held by the robot and a fixed abrasive tool, in the second embodiment.
Figure 7B:
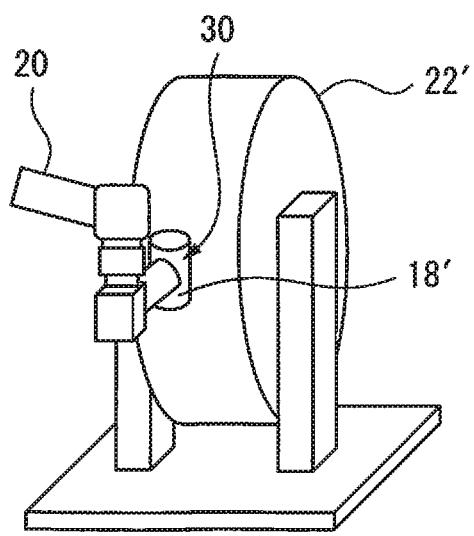

As shown in FIGS. 7a and 7b, when workpiece 18' is gripped by robot 12 and is moved so that workpiece 18' contacts abrasive tool 22', a contact point on the surface of workpiece 18', which contacts abrasive tool 22', is defined as a control point (or a working point) 30. Although both FIGS. 7a and 7b show states viewed from the lateral side, in which workpiece 18' is pressed to abrasive tool 22', the postures of workpiece 18' relative to abrasive tool 22' are different from each other. In addition, FIGS. 8a and 8b show the states of FIGS. 7a and 7b, respectively, viewed from the above.

Generally, in order to judge the quality of the workpiece after the abrasion, it is effective to display the position of the control point and force information at the position. In this regard, the control point is determined by calculating an intersection point between the surface of the workpiece and the surface of the tool; however, it may be difficult to calculate the intersection point depending on the shapes of the workpiece and the tool.

Figure 9A:
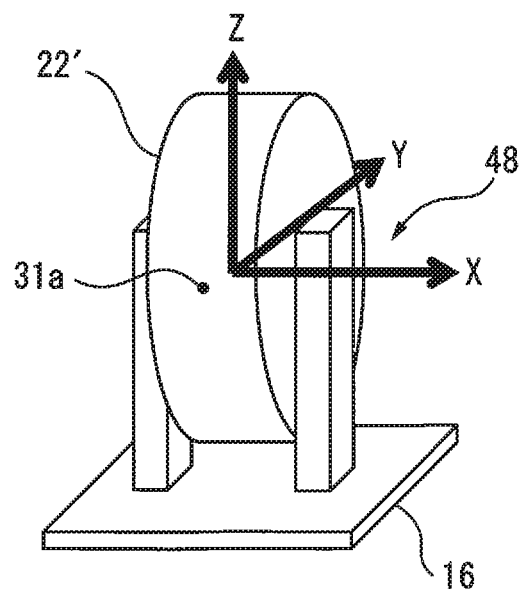
FIG. 9a shows an example in which the workpiece contacts the abrasive tool at one point, in the second embodiment.
Figure 9B:
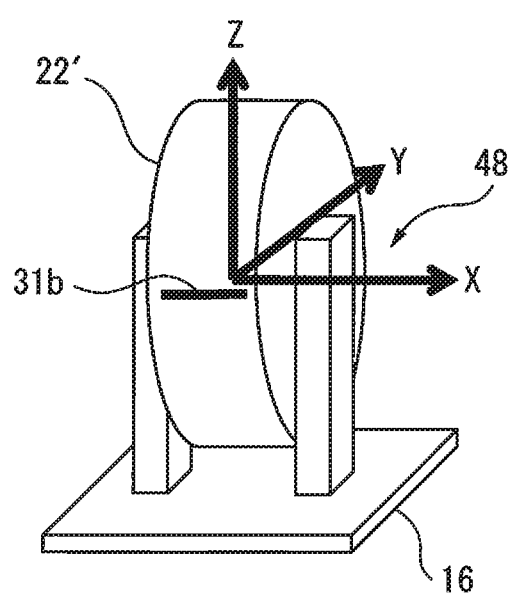
FIG. 9b shows an example in which the workpiece contacts the abrasive tool at a liner portion, in the second embodiment.

Therefore, in the second embodiment, a case in which workpiece 18' contacts abrasive tool 22' at one point (contact point 31a) on the surface of abrasive tool 22' as shown in FIG. 9a, and a case in which workpiece 18' contacts abrasive tool 22' at a linear portion (contact line 31b) on the surface of abrasive tool 22' as shown in FIG. 9b, will be explained. When abrasive tool 22' is manufactured from an abrasive material which is easily worn, and therefore it is normal for workpiece 18' to be in contact with the abrasive tool at the linear portion while being reciprocated, so that abrasive tool 22' is evenly worn.

Figure 8A:
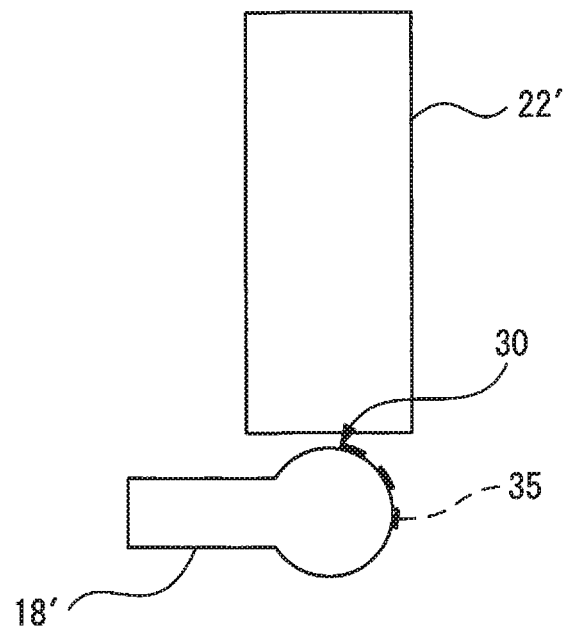
FIG. 8a shows the workpiece and the abrasive tool of FIG. 7a viewed from the above.
Figure 8B:
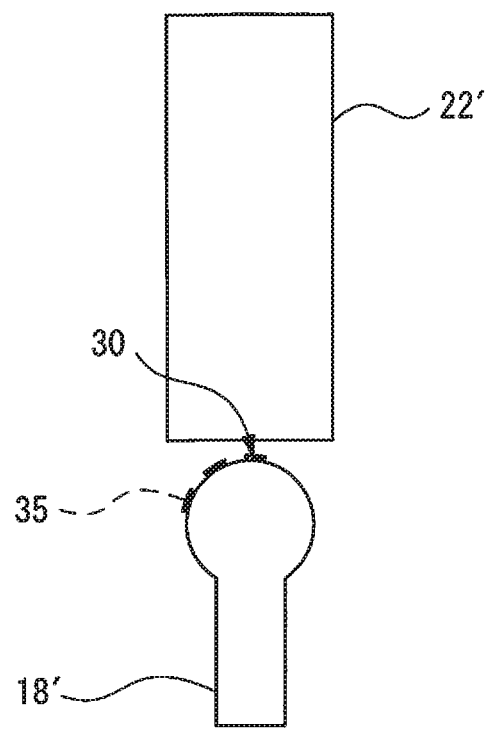
FIG. 8b shows the workpiece and the abrasive tool of FIG. 7b viewed from the above.
Figure 10:
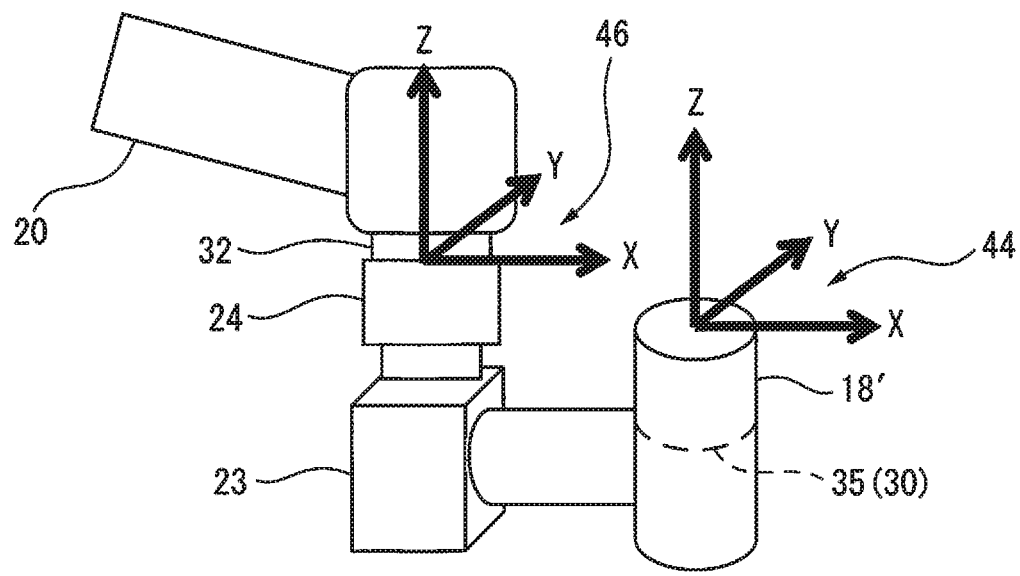
FIG. 10 shows a periphery about a front end of a robot arm, in the second embodiment.

As indicated by a dashed line 35 in FIG. 8a, 8b or 10, control point 30 moves on the surface of workpiece 18'. In this regard, as shown in FIG. 10, a first orthogonal coordinate system 44, fixed to the workpiece, is defined. The position and orientation of first orthogonal coordinate system 44 have a constant relationship with a second orthogonal coordinate system 46 defined on a mechanical flange 32 of robot 12.

On the other hand, as shown in FIG. 5, a third orthogonal coordinate system 34 is defined with respect to robot 12, similarly to the first embodiment. In third coordinate system 34, a floor surface 36 on which robot 12 is located is defined as an X-Y plane, and an intersection point 38 between the X-Y plane and an axis (in this case, J1 axis) among a plurality axes of robot 12, which is the nearest to floor surface 36 and is not perpendicular to the Z-axis (i.e., the axis is not included in a plane parallel to the X-Y plane), is defined as the origin of coordinate system 34. Further, an axis extending in the front direction of robot 12 is defined as the X-axis, an axis included in the X-Y plane and perpendicular to the X-axis is defined as the Y-axis, and an axis perpendicular to the X-Y plane is defined as the Z-axis. In addition, as shown in FIG. 6, an orthogonal coordinate system corresponding to third coordinate system 34 can also be defined and displayed on indicator 28 with respect to the displayed robot.

Further, in the second embodiment, as shown in FIGS. 9a and 9b, a fourth orthogonal coordinate system 48 fixed to abrasive tool 22' is defined. The position and orientation of fourth orthogonal coordinate system 48 have a constant relationship with third orthogonal coordinate system 34 defined with respect to robot 12 (FIG. 5).

A conversion matrix from fourth orthogonal coordinate system 48 to third orthogonal coordinate system 34 can be represented by a constant matrix T2 (4×4 matrix). Further, a conversion matrix T1 from third orthogonal coordinate system 34 to first orthogonal coordinate system 44 defined with respect to workpiece 18' can be calculated by a conventional kinematics method, as long as an angle and a link length of each axis of robot 12 are previously known. Accordingly, a conversion matrix T (4×4 matrix) from fourth coordinate system 48 to first coordinate system 44 can be represented as a product of matrixes T1 and T2, as shown by a following equation (1). Note that matrix T is varied in association with the motion of robot 12.

$$T = T1 \cdot T2 \tag{1}$$

In FIG. 9a, the position of contact point 31a can be calculated as a coordinate on fourth orthogonal coordinate system 48. In the example of FIG. 9a, fourth coordinate system 48 can be defined so that the origin of coordinate system 48 corresponds to a center of a cylinder constituting abrasive tool 22', and X-, Z- and Y-axes of coordinate system 48 correspond to the direction of the center axis, the vertical direction and the direction perpendicular to the X- and Z-axes, respectively. Assuming that the motion of robot 12 is taught so that, with respect to intersection points between the Y-axis and the surface of abrasive tool 22', abrasive tool 22' contacts workpiece 18' at a side near robot 12, the position of contact point 31a is represented as (0, −r, 0), wherein "r" is a radius of the cylinder. In this regard, by using conversion matrix T from fourth coordinate system 48 to first coordinate system 44, the coordinate of contact point 31a on first orthogonal coordinate system 44 is calculated as a product of matrix T and a column vector R1 (T·R1). Note that column vector R1 is a transposed vector of a row vector (0, −r, 0, 1). In addition, when the actual position of contact point 31a is deviated from coordinate (0, −r, 0) on orthogonal coordinate system 48, the actual position is previously measured so as to correct the above product.

Although contact line (or trajectory) 31b as shown in FIG. 9b can be calculated similarly to the case of FIG. 9a, it is usually difficult to calculate a precise equation of the trajectory. Therefore, assuming that the motion of robot 12 is taught so that the contact point represents a reciprocating motion in the X-direction of fourth orthogonal coordinate system 48, the reciprocating motion corresponding to a sine wave having an amplitude "m" and a cycle of "F," the contact point included in contact line 31b on fourth coordinate system 48 at a time point "t" is represented as (m·sin (2πt/F), −r, 0).

Therefore, contact line 31b on first coordinate system 44 at time point "t" is calculated as a product of matrix T and a column vector R2 (T·R2), by using conversion matrix T from fourth coordinate system 48 to first coordinate system 44. Note that column vector R2 is a transposed vector of a row vector (m·sin(2πt/F), −r, 0, 1). In addition, as shown in FIG. 6, robot 12 and/or the above coordinate systems can be displayed on indicator 28.

During the abrasive operation of robot 12, robot controller 14 obtains the position of the control point (working point) on first orthogonal coordinate system 44 and the pressing force at the position, at predetermined intervals. Indicator 28 can display the position of the working point on first coordinate system 44. In this regard, all of the obtained positions of the working points may be displayed, alternatively, the number of working points to be displayed may be decreased depending on a number of pixels or a display rate, etc., of indicator 28. By connecting the displayed positions in chronological order, a trajectory 50 (FIG. 11) or trajectories 52a, 52b (FIG. 12) can be obtained with respect to the working points during the abrasion.

Figure 11:
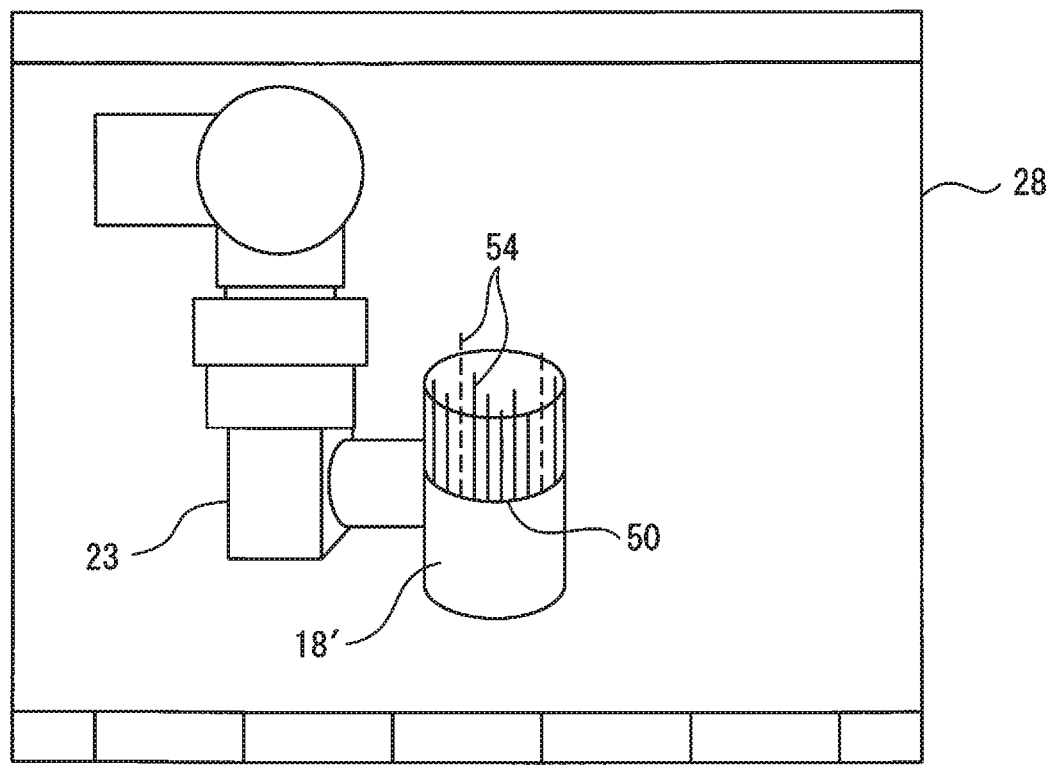
FIG. 11 shows an example in which the force at each working point is displayed as a line segment when the number of a trajectory of the working points is one in the second embodiment.

As shown in FIG. 11, robot controller 14 calculates the magnitude of the acting force (or the pressing force) at each position of a plurality of working points 30 of trajectory 50. Then, indicator 28 displays the pressing force as a line segment 54 extending in the Z-direction, the origin of which corresponds to each working point or a point in the vicinity of the working point. In this regard, the expression "in the vicinity of (the working point)" herein means that the line segment does not extend precisely from the corresponding working point, but the operator can understand at which working point the line segment represents the force.

It is preferable that the length of line segment 54 be proportional to the magnitude of the pressing force. For example, the force of one newton (1N) may be represented as a line segment having the length of 10 mm on first orthogonal coordinate system 44. In this regard, the extending direction of line segment 54 or the length corresponding to 1N may be appropriately set or modified.

Instead of line segment 54 extending in the +Z-direction, a force vector may be displayed. For example, when the force vector is (1.5N, 0.23N, 36.2N) and the force of 1N is represented as the length of 10 mm, the force is represented as a vector (15 mm, 2.3 mm, 362 mm) having the origin corresponding to each working point, on first orthogonal coordinate system 44.

Further, a line segment or a vector extending in a predetermined direction may be displayed, with respect to only one or more factor selected from among X-, Y- and Z-components of the force or the magnitude of the force, detected by force detecting part 24. For example, only the X-component of the force at each working point may be displayed as a line segment extending in the +Z-direction.

Figure 12:
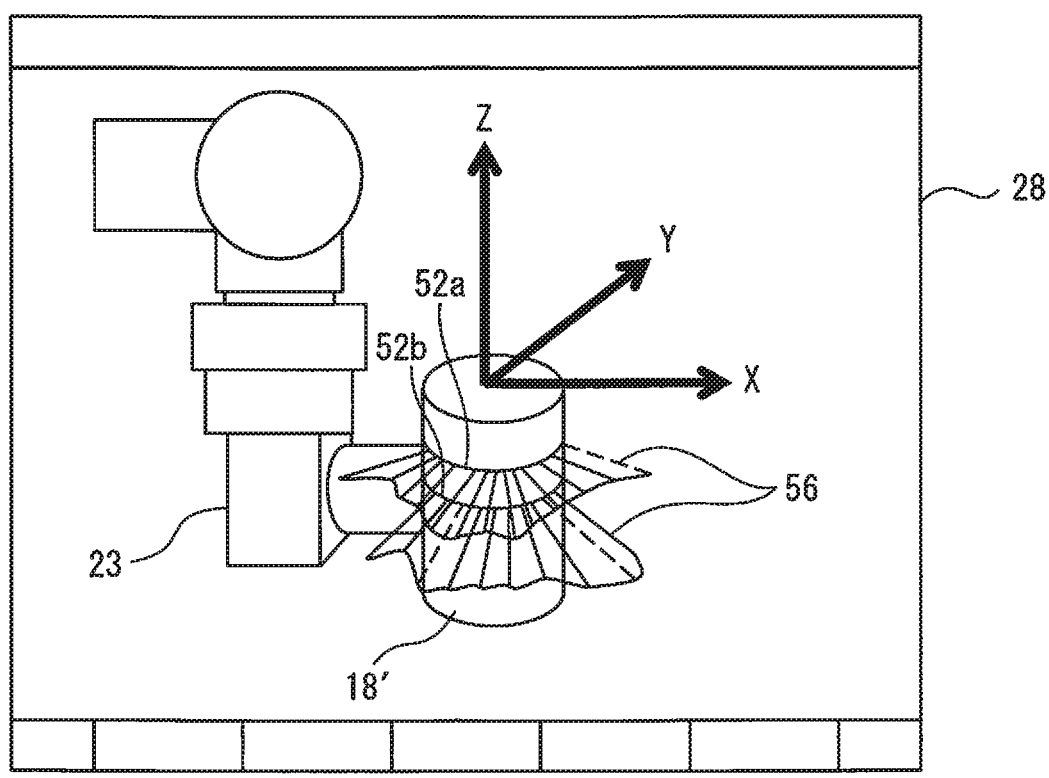
FIG. 12 shows an example in which the force at each working point is displayed as a line segment when the number of a trajectory of the working points is two or more in the second embodiment.

As shown in FIG. 11, when there is only one trajectory 50 regarding control points 30, the visibility of the line segments is not affected, whichever direction each line segment extends in. On the other hand, as in the abrasion indicated by trajectories 52a and 52b as shown in FIG. 12, when there are a plurality of trajectories deviated from each other by a small distance, a plurality of line segments may be overlapped with each other and cannot be easily discriminated from each other, if each line segment extends in the same direction. Therefore, as shown in FIG. 12, line segments 56 representing the force may be displayed so as to radially extend on a plane parallel to the X-Y plane.

Similarly to the first embodiment, indicator 28 may have various display styles. For example, a line segment-like shape, such as the above vector, a column or an arrow, may be used instead of line segments 54 and 56. In addition, indicator 28 may display the line segment or the line segment-like shape in real-time during the abrasion. Otherwise, during the abrasion, the position and the force of the working point may be associated with each other and may be stored in a suitable memory, and then the stored position and the force may be displayed together after the abrasion.

Indicator 28 may change display colors depending on the magnitude of the force, whereby the operator can easily and visually find a position where the force is excessive or a position where the force is insufficient. For example, when the magnitude of the force at each working point is lower than a predetermined first threshold (for example, corresponding to 80% of a setting value), the color of the line segment or the line segment-like shape may be first color (e.g., white). Further, when the magnitude of the force at each working point is higher than a predetermined second threshold (for example, corresponding to 120% of the setting value), the color of the line segment or the line segment-like shape may be second color (e.g., red) (in FIGS. 11 and 12, indicated by a broken line), and when the magnitude of the force at each working point is between the first and second thresholds (i.e., from 80% to 120% of the setting value), the color of the line segment or the line segment-like shape may be third color (e.g., green) (in FIGS. 11 and 12, indicated by a solid line).

As another displaying method, when the magnitude of the force satisfies a predetermined condition, the line segment or the line segment-like shape representing the force may be blinked, or a mark may be displayed in the vicinity of the line segment or the line segment-like shape. For example, when the magnitude of the force is higher than the second threshold, the line segment or the line segment-like shape representing the force may be blinked. Alternatively or additionally, in the vicinity of the line segments or the line segment-like shapes representing the maximum force and the minimum force, characters such as "maximum" and "minimum" may be added, respectively, or a sign such as a circle may be added.

In the preferred embodiments as explained above, the robot controller controls the motion of the robot so that one of the work tool and the workpiece to be processed by the work tool is moved relative to the other, and carries out the predetermined operation. According to the present invention, in a robot system using a force sensor, it is possible to understand as to how the force is applied to a workpiece in a series of operations, such as polishing, burring or close tolerance fitting, etc., and easily observe as to where in the workpiece the force becomes minimum or maximum. When the pressing force is insufficient or zero at a certain portion of the workpiece during the polishing or burring, it can be understood that a work tool is not sufficiently pressed to the portion or is separated from the portion. Therefore, it is likely that such a portion is not properly polished or burred. On the other hand, when the pressing force is too high at a certain portion of the workpiece, the portion may be damaged or excessively scraped. By the present invention, such information can be visually and easily monitored on the display, it is possible to check the portion where the force is too high, and/or retry the operation with respect to the portion where the force is insufficient. Further, when the operation is close tolerance fitting, the workpiece may be damaged due to excess force generated by "wedging" during the fitting. However, in the present invention, since the portion where the excess force is applied to can be easily found, it is possible to check the portion of the actual workpiece only, and/or retry the operation.

According to the invention, the operator can visually and easily understand how much force is applied to which portion of the workpiece during the operation such as polishing, burring or close tolerance fitting, etc. Therefore, the operator can easily specify the portion where the processing is not carried out properly, and can rapidly take appropriate measures.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller configured to control a motion of a robot gripping a workpiece to be processed so that the workpiece is moved relative to a work tool, and to carry out a predetermined operation, the robot controller comprising:
   a force detecting part configured to detect a force acting between the work tool and the workpiece; and
   a displaying part configured to display simulated images or a video of the robot, the work tool and the workpiece,
   wherein positions of working points on a surface of the workpiece, where the force by the work tool is applied, are calculated based on a coordinate system defined with respect to the robot, a coordinate system defined with respect to the workpiece, and a coordinate system defined with respect to the work tool,
   wherein the displaying part is configured to display a trajectory of the working points as points on the coordinate system defined with respect to the workpiece,
   wherein the force detecting part is configured to detect the force applied to each working point when the work tool passes through the working point on the trajectory, and
   wherein the displaying part is configured to display the detected force as a line segment or a line segment-like shape, an origin of which corresponds to the working point or a point in the vicinity of the working point.

2. The robot controller as set forth in claim 1, wherein the displaying part is configured to display
   the coordinate system defined with respect to the robot, and
   the force detected by the force detecting part as the line segment-like shape being a vector on the coordinate system defined with respect to the robot.

3. The robot controller as set forth in claim 1, wherein the displaying part is configured to display
   the coordinate system defined with respect to the robot as an orthogonal coordinate system, constituted by X-, Y- and Z-axes, and
   the line segment or the line segment-like shape being a vector in a predetermined direction, with respect to only one or more factors selected from among X-, Y- and Z-components of the force or a magnitude of the force, detected by the force detecting part.

4. The robot controller as set forth in claim 1, wherein the displaying part is configured to display the line segment or the line segment-like shape while changing a color thereof, based on a magnitude of the force.

5. The robot controller as set forth in claim 1, wherein, when a magnitude of the force satisfies a predetermined condition, the displaying part is configured to display the line segment or the line segment-like shape representing the force, while blinking the line segment or the line segment-like shape, or while indicating a mark in the vicinity of the line segment or the line segment-like shape.

* * * * *